July 21, 1959  E. C. KASTNER  2,895,550
RECIPROCATING CUTTING WITH AUTOMATICALLY INTERRUPTED FEED
Filed June 7, 1954  3 Sheets-Sheet 1

INVENTOR.
Edward C. Kastner
BY Bates, Teare & McLean
Attorneys

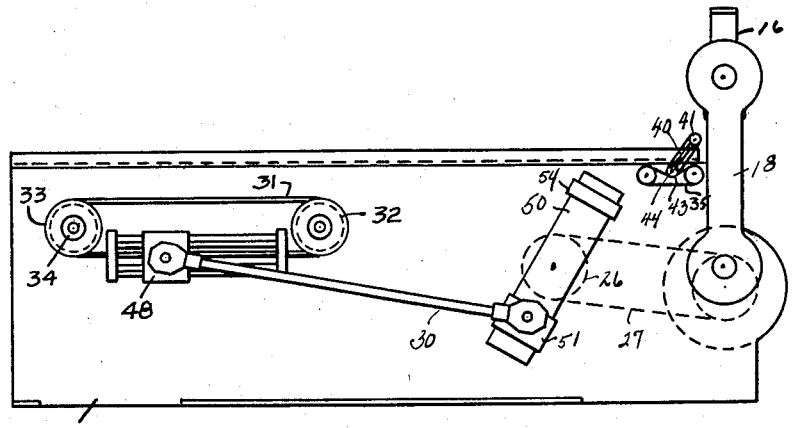

United States Patent Office 2,895,550
Patented July 21, 1959

2,895,550
RECIPROCATING CUTTING WITH AUTOMATICALLY INTERRUPTED FEED

Edward C. Kastner, Akron, Ohio, assignor to Akron Standard Mold Company, Akron, Ohio, a corporation of Ohio Application June 7, 1954, Serial No. 434,940

5 Claims. (Cl. 164—48)

This invention relates to an improved apparatus for cutting sheet material into predetermined lengths and more particularly to an improved arrangement for synchronizing a sheet material feed with the cutter operation.

In conventional apparatus for cutting sheet or strip material into predetermined lengths, the momentum of moving parts and of the moving stock limits the accuracy to an undesirable degree. Attempts have been made to improve the accuracy of the control by providing the apparatus with over-running clutches. This type of clutch, however, depended on being overrun by the apparatus at a maximum velocity, after which the apparatus was no longer controlled by the clutch and required a drag brake or the like to hold the overrunning load. Thus, a desirable feature of such an apparatus relates to an improved control of the stock and apparatus movements to provide a precisely accurate cutting action. This is particularly true when, as in building tires, the stock is rubber or some other flexible material that is capable of distortion unless the material feed and cutting operation are accurately controlled in relation to each other.

Accordingly, a principal object of this invention relates to an arrangement for accurately cutting sheet material into predetermined lengths independently of the momentum of the stock and other moving parts of the apparatus.

Another principal object of this invention relates to the provision of a sheet cutting apparatus for synchronously feeding stock in step with the cutting of the stock into predetermined lengths.

Briefly, the foregoing is accomplished in accordance with this invention by a controlled feeding of the sheet material past a reciprocating cutter while the cutter is inactive and by positively holding the sheet material in fixed position when the cutter is active. The arrangement includes an electrical drive for the cutter and for the stock feed and utilizes an electro-magnetic brake and clutch mechanism synchronously coacting between the stock feed and the cutter drive.

In the drawings:

Fig. 4 is a rear view of the apparatus illustrating the drive coupling to the material feed;

Fig. 5 is a sectional view of the material feed drum taken along the lines 5—5 in Fig. 1.

Figure 1:
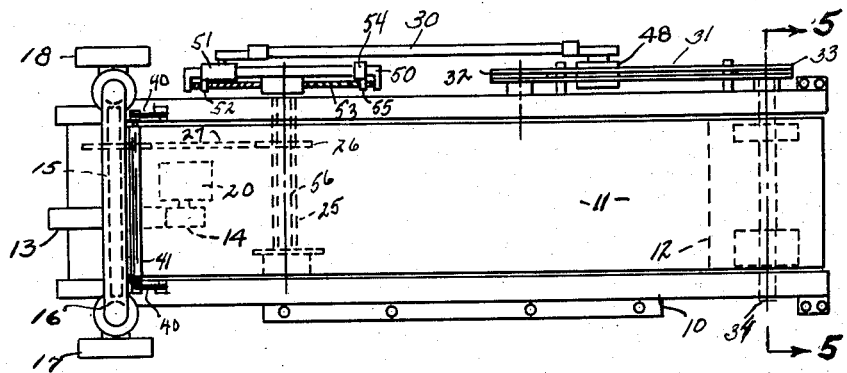
Fig. 1 is a top view of the apparatus illustrating selected portions in dotted lines.
Figure 2:
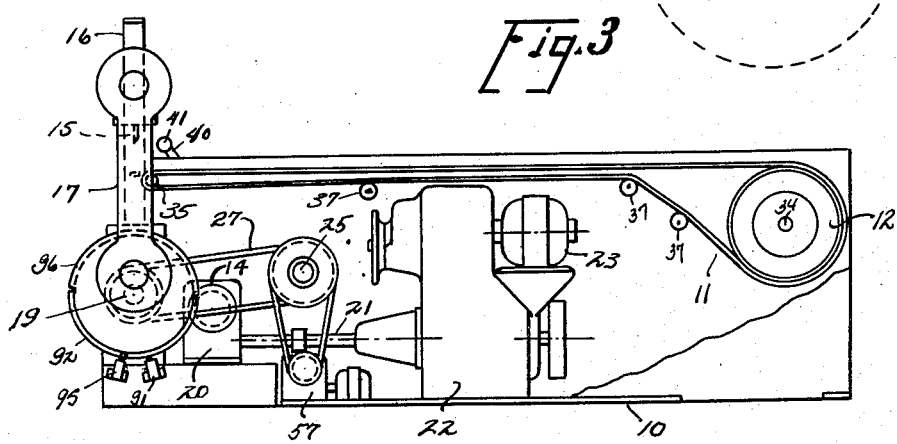
Fig. 2 is a front view of the apparatus with the corresponding side panel removed.

Referring now more particularly to Figs. 1 and 2 of the drawings, the cutting apparatus is shown as including principally a supporting frame 10, a conveyor belt 11 driven from a drum 12 and a guillotine-type reciprocal cutter blade 15. The cutter blade 15 moves up and down in a vertical frame 16 at one end of a pair of spaced crank arms 17 and 18 whose other ends are eccentrically connected for rotation about a driven shaft 19 rotatably mounted within the enclosed frame 10.

The cutter drive shaft 19 carries a bull gear 13 which is driven by a pinion 14 from a speed-reducing gear box 20 which in turn is coupled through a drive shaft 21 to a variable speed electrical drive 22 which is mounted along with its electrical drive motor 23 within the enclosed frame 10. Thus, when the drive motor 23 is energized, the cutter blade 15 is reciprocated vertically towards and away from the adjacent extremity of the conveyor belt 11 which is adapted to feed sheet material, such as strip rubber, for the production of tire building tread elements in a manner to be hereinafter more fully described.

Figure 3:
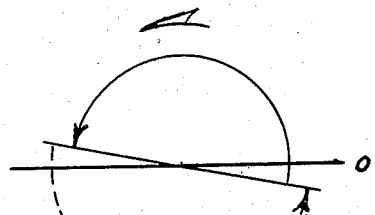
Fig. 3 is a motion diagram of the clutch and brake operation.

Another drive shaft 25 is disposed transversely of the frame and parallel to the cutter drive shaft 19. These shafts are coupled together by a pulley 26 and belt 27, as best shown in the dotted lines of Fig. 1. This second drive shaft 25 is coupled at one end external of the frame 10 to a crank 50 which is in turn connected by link 30 to a slide block 48 to drive a sprocket chain 31, as best shown in Figs. 1 and 4 of the drawings. The sprocket drive includes a pair of sprocket wheels 32 and 33 one of which is mounted for rotation on the frame 10 and the other of which is carried by the shaft 34 of the conveyor drive drum 12. The drum 12 is journalled for rotation between the frame sides and the conveyor belt 11 extends around the drum 12 and an idler roller 35 adjacent the cutter frame 16 and is tensioned by suitable tension rollers 37 disposed along its length within the frame 10. The link 30 and slide block 48 translate the motion of the crank 50 into a rocking motion of the drum shaft 34 as will be hereinafter more fully described in connection with the diagram of Fig. 3. The top of the frame enclosure is open to permit the conveyor belt 11 to pass sheet material from the drum end of the frame towards the cutter blade 15 and between the frame sides. A rocker arm 40 is pivotally coupled to the frame sides adjacent the cutter end of the frame and carries a roller 41 which engages the stock material as it is fed towards the cutter 15 to maintain such material flat on the conveyor belt 11. The roller 41 is thus driven at the same speed as the stock material and conveyor belt, by means of a looped belt 43 and another roller 44 at the pivotal connection of the rocker arm 40 which is in turn rotated by a looped belt 45 driven by the roller 35 which is in turn driven by the conveyor belt 11.

It is well apparent that the pulley coupling between the cutter drive shaft 19 and the crank drive shaft 25 may be arranged so that the link 30 will move the conveyor belt 11 through its sprocket drive connection intermittently and in step with the movement of the cutter 15, so that as the cutter 15 is retracted from the stock material, the link 30 moves the next length of stock material forward and, as the cutter 15 moves toward engagement with the stock material, the link 30 is returning the slide block to its original position. Actually, with the arrangement shown, mechanism is provided for positively maintaining the conveyor belt 11 stationary during the return movement of the link 30. This arrangement will be hereinafter more fully described in greater detail in connection with its synchronization to the cutter movement.

In order to accommodate different rates of cutter and conveyor operation to provide different lengths of stock material, the coupling between the driven extremity of the link 30 and the drive shaft 25 is made adjustable along the crank 50 so that the throw of the crank 50 may be varied accordingly. This is accomplished by mounting a slide bracket 51 for movement along the crank 50 and pivotally connecting the driven end of the link 30 to the slide bracket. The bracket 51 in turn has a lug 52 which threadingly engages a screw 53 that may be manually or automatically turned to accomplish any variation in the throw of the crank 50. As best shown in Figs. 1 and 4 of the drawings, the crank 50 also carries a counterweight which is in the form of a slide bracket 54 and which also has a lug 55 in threaded engagement with the screw 53 for cooperative adjustment with the bracket 52 to maintain the desired balance. In the drawings, and referring particularly to Fig. 1 thereof, the crank drive shaft 25 is shown as enclosing a second shaft 56 which in turn is coupled to an independent drive 57 disposed within the enclosing frame 10. The inner shaft 56 may be coupled at the cross arm extremity through suitable mechanism, one form of which includes a planetary gearing or the like to selectively rotate the screw 53 and thereby adjust the respective slide brackets 51 and 54 along the crank 50 to automatically vary the throw of the crank. This adjustment may be initiated by merely pressing a push button to energize the independent drive.

As hereinbefore noted, it is desired that the conveyor belt 11 feed the stock material forward towards the cutter 15 only while the cutter is inactive or moving from an active to an inactive position. Reference to Fig. 5 of the drawings illustrates in section the conveyor drive drum 12 and an electro-magnetic clutch arrangement which may be energized to positively rotate the drum 12 when the link 30 is moving in the forward direction and de-energized when the link 30 is moving in the return direction. Thus, the clutch operates to engage the conveyor load at zero horizontal velocity, positively maintains the engagement during the accelerating and decelerating movement of the link 30, and then releases the conveyor load at zero horizontal velocity to provide a controlled feed during the entire stroke. With this arrangement, the conveyor load is never out of control of the clutch during the moving stroke of the driving link 30.

The drum shaft 34, which is driven by the sprocket coupling to the link 30 is journalled at each end in suitable frame bearings 61 and 62 and carries bearing supports 63 and 64 for the drum 12. The clutch includes a pair of annular electro-magnets 65 and 66 which are physically connected in axial spaced relation from each other through a sleeve 67 that is in turn keyed to the drum shaft 34. The annular clutch magnets 65 and 66 may be selectively magnetized by energizing the respective magnet coils 68 and 69.

The conveyor drum 12 is hollow and has an internal spider 70 which carries a pair of annular armatures 71 and 72, made of suitable magnetically susceptible materials capable of magnetic attraction to the corresponding magnet. The connection between the drum spider 70 and the armatures is a sliding connection through a series of circumferentially spaced drive pins 73 so that the armatures are free for axial movement along the pins towards and away from the corresponding clutch magnets 65 and 66. Thus, when the magnets 65 and 66 are energized they will attract and lock the corresponding armatures 71 and 72 and the drum 12 will rotate with the shaft 34 as the crank 30 moves in a forward direction. Similarly, when the magnets 65 and 66 are de-energized, the armatures 71 and 72 are released and the shaft 34 will rotate freely within the hollow drum 12, the drum remaining stationary during the return movement of the crank 50. Electrical energy may be conveniently supplied to the magnetic coils through suitable collector rings and bus or through a slip ring arrangement not forming part of this invention and therefore not shown in detail.

The foregoing clutch arrangement may be electrically synchronized with the cutter operation so that the stock material is moved forward when the cutter 15 is moving towards an inactive position and is not moved when the cutter 15 is moving towards an active or cutting position. Because of the time constant of the electromagnetic clutch energizing circuit, it is preferred that energization and deenergization of the clutch lead the zero velocity or null positions of the link stroke as shown by the solid arrow in Fig. 3 of the drawings where the horizontal reference line represents the condition of zero velocity. To further insure accurate control of the material length, there is provided an electro-magnetic brake arrangement for holding the conveyor drum 12 stationary during the return movement of the link 30 and active or cutting movement of the cutter 15. The time constant of the brake energizing circuit also is compensated by energizing and deenergizing the brake ahead of the null stroke positions as shown by the dotted line arrow in Fig. 3. In this way, active operation of both the clutch and brake at precisely the null stroke positions is insured and there is no time during the cycle of operation when the conveyor load is not under positive control of either the clutch or the brake. The amount of lead in each case can be adjusted in accordance with the time constant of the respective energizing circuit in a manner to be hereinafter more fully described.

Referring again to the sectional view of Fig. 5, the brake is shown as including an annular electro-magnet 75 similar to the type utilized for the electro-magnetic clutch except that the magnet 75 in the case of the brake is fixedly mounted to the one of the frame sides in stationary position. The drum shaft 34 is free to rotate within the annular brake magnet 75 and the drum 12 has another internal spider 77 which fixedly carries an annular armature 78 on circumferentially spaced drive pins 79 which permit the annular armature to be displaced axially toward and away from the brake magnet 75. The armature 78 in the case of the brake preferably carries on its engaging face a suitable molded friction material 80 adapted to act as a brake lining against the adjacent face of the brake magnet. With this arrangement, when the brake magnet coil 76 is energized, the brake armature 78 is attracted into engagement with the brake magnet 75 and, because of its fixed connection to the drum spider 77, will lock the drum 12 against further rotation. Energization of the brake magnet is preferably synchronized with the cutter and crank movement and with the clutch operation by suitable electrical controls in a manner to be hereinafter more fully described.

Figure 6:
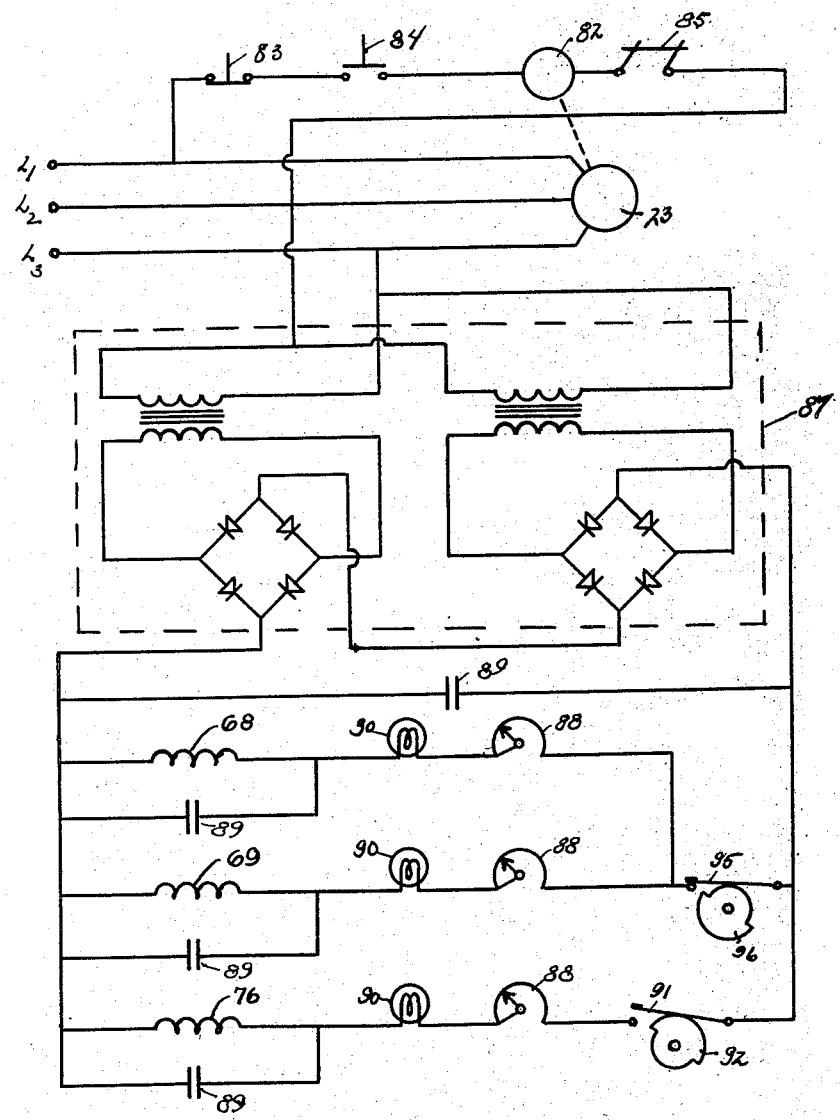
Fig. 6 is a schematic diagram of the drive control circuit.

Referring now to Fig. 6 of the drawings, there is shown a schematic circuit diagram for the drive, clutch and brake circuits. The variable speed electrical drive motor 23 is shown connected across a three phase alternating current supply line through a magnetic starting circuit including the motor starter 82 and start and stop switches 83 and 84 along with suitable overload protection in the form of a reset overload switch 85. The clutch and brake circuits are in turn connected in parallel across one phase of the three phase supply through a suitable bridge type full-wave rectifier designated generally at 87.

Each magnet coil branch circuit includes a rheostat 88 which permits variation of the amount of resistance in series with the corresponding magnet coil, thereby enabling control and cushioning of the torque within a wide range of settings. Suitable condensers 89 are provided in the control circuit and across each of the magnet coils to accommodate the high instantaneous currents that may result when the clutch and brake magnets are energized for instant start and stop under heavy loads. The condensers 89 thus provide a close-control over current build-up in the magnets to reduce shock and to accurately control acceleration of the apparatus. Each of the magnet branch circuits also includes a pilot lamp 90 for indicating when the respective clutch and brake magnets are operative. The clutch magnet coils 68 and 69 are connected in parallel through a cam operated switch 95 and the brake magnet coil 76 is independently connected in the circuit through another cam operated switch 91. A clutch coil switch 96 is designed to maintain the clutch magnet coils energized during the forward motion of the link 30 corresponding to an inactive position of the cutter 15, while a brake coil switch cam 92 is designed to render the brake operative during the return motion of the link 30 which corresponds to the active movement of the cutter 15. Each of these switch cams are operatively mounted on the cutter drive shaft 19, as best shown in Fig. 2 of the drawings, and the corresponding switches 91 and 95 are positioned on the frame 10 adjacent the corresponding cam surface. The switch cams 92 and 96 may be adjustably positioned relative to each other on the shaft 19 to vary the synchronization of the clutch and brake circuits so as to maintain their operation in step with the cutter movements. As hereinbefore noted, their preferred positions are such that they will energize and deenergize the clutch and brake respectively ahead of the corresponding null positions of the link 30, thereby insuring starting and stopping the conveyor from and at a condition of zero movement. The cam operated switches may be any type of conventional normally closed limit switch which can be suitably mounted on the frame 10 for coaction with the respective cams.

Thus, there has been provided a controlled stock material feed which intermittently advances the sheet material in step with the inactive positioning of a reciprocating cutter and a positive acting brake which will hold the sheet material in fixed position in step with the active cutting position of the cutter. The clutch and brake mechanisms are electro-magnetically operated with a direct electrical control enabling rapid operation without sacrificing close control and accuracy of the cutting operation. The length of sheet material may be varied by adjusting the cutter and conveyor drives and similarly synchronizing the operation of the clutch and brake mechanism. The result is a positively acting cutter which may be remotely controlled for automatic operation to provide accurate predetermined lengths of sheet material which may be optimumly utilized in production.

I have shown and described what I consider to be the preferred embodiments of my invention along with suggested modified forms and it will be obvious to those skilled in the art that other changes and modifications may be made without departing from the scope of my invention as defined by the appended claims.

I claim:

1. A sheet cutting apparatus comprising in combination, a frame, said frame having a conveyor including a material supporting belt and a rotatable drum for moving the belt, a source of motive power having a driven shaft, a drum shaft carried by the frame and supporting the drum for free rotation thereon, coupling means for translating continuous rotation of the driven shaft into reciprocable rotation of the drum shaft forward and rearward relative to the sheet material advancing direction, clutch means operably disposed for coaction between the drum and drum shaft, brake means operably disposed for coaction between the drum and the frame, a cutter adapted to be positioned towards and away from cutting engagement with sheet material on the belt, means for moving the cutter away from the material in synchronism with forward rotation of the drum shaft and towards the material while the drum shaft is rotated rearwardly, and electrical means coacting with said cutter movement to selectively activate said clutch and brake means respectively as the cutter moves away from and toward engagement with the material.

2. In a sheet cutting apparatus, a frame, a reciprocable cutter operatively supported by the frame and adapted to be reciprocated between an active and an inactive cutting position, means for reciprocating cutter, a conveyor adapted to carry sheet material past the reciprocable cutter, said conveyor including a shaft rotatably supported by the frame and a drum supported for free rotation on the shaft, drive means for reciprocable rotating the shaft forward and rearward with respect to the direction of material feed and in synchronism with the inactive and active positioning of the cutter respectively, an electromagnetic clutch adapted to coact when energized to couple the drum and shaft together for unitary movement, an electromagnetic brake adapted to coact when energized between the drum and the frame to hold the drum stationary, a clutch energizing circuit and a brake energizing circuit, independent switch means in each energizing circuit adapted to apply and remove a source of electrical energy, a pair of switch cams adjustable relative to each other and each adapted to be positioned to engage and operate a corresponding switch means respectively, and means operated by said cutter reciprocating means for cyclically positioning each of said cams to synchronously activate said clutch and brake respectively at the beginning and end of the forward stroke of said drive means and to de-activate said clutch and brake respectively at the beginning and end of the rearward stroke of said drive means, thereby positively controlling the material feed throughout the entire cutter cycle and in synchronism therewith.

3. The apparatus of claim 2 wherein said switch cams are each adjusted to engage their respective switch means ahead of the beginning and end of the corresponding stroke of said drive means respectively a distance equivalent in time to the time constant of the respective energizing circuits, thereby insuring positive activation of the clutch and brake at the beginning and end of the corresponding stroke of said drive means respectively.

4. In a sheet cutting apparatus the combination of a frame, a conveyor supported by the frame and including a sheet material supporting belt and a rotatable drum for moving the belt, a guillotine cutter operably supported by the frame for reciprocable movement towards and away from cutting engagement with sheet material on the belt, a source of motive power having a driven shaft, crank means for reciprocably coupling the cutter to the driven shaft, a drum shaft rotatably mounted in the frame and supporting the drum for free rotation thereon, a second crank means reciprocably coupling the drum shaft to the driven shaft to synchronously rotate the drum shaft in the conveyor advancing direction as the cutter is moved away from the sheet material, clutch means operably disposed for coaction between the drum shaft and the drum, brake means operably disposed for coaction between the drum and the frame, and means for synchronously activating the clutch means and the brake means respectively as the cutter is moved away from and towards engagement with the sheet material.

5. The apparatus of claim 4 wherein said means for activating the clutch means and the brake means include a pair of axially spaced cam surfaces each active over a different half of the drive shaft rotation, and wherein said clutch and brake means are each electrically activated and include an electrical activating circuit having plural switch means, one of which coacts with one cam surface to activate the clutch means while the cutter is positioned away from the sheet material and the other of which coacts with the other cam surface while the cutter is positioned towards engagement with the sheet material, said brake means thereby coacting to hold the sheet material stationary during the cutting operation.

References Cited in the file of this patent

UNITED STATES PATENTS

| | | |
|---|---|---|
| 48,395 | Hatch | June 27, 1865 |
| 110,631 | Coffin | Jan. 3, 1871 |
| 504,993 | Myers | Sept. 12, 1893 |
| 678,371 | Bender | July 16, 1901 |
| 1,009,791 | Rush | Nov. 28, 1911 |
| 1,224,107 | Hawkins et al. | Apr. 24, 1917 |
| 2,077,439 | Schmitt | Apr. 20, 1937 |
| 2,108,767 | Fitzgerald | Feb. 15, 1938 |
| 2,188,871 | Broekhuysen | Jan. 30, 1940 |
| 2,309,343 | Farrow | Jan. 26, 1943 |
| 2,360,275 | Rau | Oct. 10, 1944 |
| 2,389,929 | Paulsen | Nov. 27, 1945 |
| 2,514,261 | Scheffey | July 4, 1950 |
| 2,541,737 | Bardsley et al. | Feb. 13, 1951 |
| 2,642,136 | Burnett | June 16, 1953 |
| 2,674,308 | Knobel | Apr. 6, 1954 |
| 2,839,138 | Wilhelm | June 17, 1958 |